(12) United States Patent
Cysewski et al.

(10) Patent No.: US 11,773,585 B2
(45) Date of Patent: Oct. 3, 2023

(54) SYSTEMS AND METHODS FOR COUPLING COMPOSITE PANELS

(71) Applicant: THE BOEING COMPANY, Chicago, IL (US)

(72) Inventors: Sean Richard Cysewski, Snohomish, WA (US); Christopher B. Barney, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/565,563

(22) Filed: Dec. 30, 2021

(65) Prior Publication Data

US 2022/0251825 A1 Aug. 11, 2022

Related U.S. Application Data

(60) Provisional application No. 63/147,834, filed on Feb. 10, 2021.

(51) Int. Cl.
*E04B 1/61* (2006.01)
*E04C 2/36* (2006.01)

(52) U.S. Cl.
CPC ............ *E04B 1/6116* (2013.01); *E04C 2/365* (2013.01); *E04B 2001/6195* (2013.01)

(58) Field of Classification Search
CPC ........ E04B 1/61; E04B 1/6116; E04B 1/6112; E04B 1/612; E04B 1/6141; E04B 1/6145; E04B 1/6162; E04B 1/6183; E04B 1/6187; E04B 1/6166; E04B 1/617; E04B 1/6175; E04B 1/6179; E04B 2001/6195; E04C 2/365; F16B 5/06; F16B 5/0607; F16B 5/0614; Y10T 403/59; Y10T 403/591; Y10T 403/598; A47B 47/0075; A47B 47/042; A47B 96/20; A47B 2096/205; A47B 2220/0052; A47B 2220/0058; A47B 2230/07; A47B 2230/11

See application file for complete search history.

(56) References Cited

U.S. PATENT DOCUMENTS

| 2,340,864 | A | * | 2/1944 | Carpenter | E04B 1/6183 |
| | | | | | 292/108 |
| 2,581,816 | A | * | 1/1952 | Schlueter | E04B 1/6183 |
| | | | | | 70/136 |
| 3,280,522 | A | * | 10/1966 | Palfey | E04B 1/6183 |
| | | | | | 52/582.2 |
| 3,363,382 | A | * | 1/1968 | Forrest | F16B 5/0072 |
| | | | | | 52/584.1 |

(Continued)

OTHER PUBLICATIONS

Extended Europeans Search Report for EP 22155358.9-1014, dated Jul. 11, 2022.

*Primary Examiner* — Kyle J. Walraed-Sullivan
(74) *Attorney, Agent, or Firm* — The Small Patent Law Group LLC; Joseph M. Butscher

(57) ABSTRACT

A system and a method for securing a first composite panel to a second composite panel include a latch assembly having one or more latches. The latch assembly is configured to be secured to one of the first composite panel or the second composite panel. One or more strikes are configured to retain at least a portion of the one or more latches. The one or more strikes are configured to be secured to the other of the first composite panel or the second composite panel.

20 Claims, 11 Drawing Sheets

(56) References Cited

U.S. PATENT DOCUMENTS

| | | | | |
|---|---|---|---|---|
| 3,574,367 | A * | 4/1971 | Jankowski | B62D 33/044 403/201 |
| 5,424,118 | A * | 6/1995 | McLaughlin | E05C 3/004 428/318.6 |
| 5,452,925 | A * | 9/1995 | Huang | E05B 65/0817 292/65 |
| 5,480,117 | A * | 1/1996 | Fleming, III | E05B 9/08 52/584.1 |
| 5,678,948 | A * | 10/1997 | White | A47B 95/00 403/321 |
| 6,199,427 | B1 * | 3/2001 | Kroll | G01N 3/00 73/161 |
| 10,246,873 | B1 * | 4/2019 | Costanza | B32B 21/047 |
| 10,502,250 | B2 | 12/2019 | Lewis et al. | |
| 10,975,901 | B2 | 4/2021 | Lewis et al. | |
| 11,272,783 | B2 * | 3/2022 | Dereldv | F16B 12/24 |
| 2003/0070381 | A1 * | 4/2003 | Hawang | F16B 5/0036 52/538 |
| 2003/0175071 | A1 * | 9/2003 | Layfield | F16B 5/0012 403/292 |
| 2006/0156671 | A1 * | 7/2006 | Montague | E04B 1/6183 52/586.2 |
| 2009/0199497 | A1 * | 8/2009 | Wrightman | E04B 2/705 52/745.1 |
| 2009/0241460 | A1 * | 10/2009 | Beaulieu | E04B 1/6137 52/586.2 |
| 2010/0111598 | A1 * | 5/2010 | Baur | E05B 63/123 403/348 |
| 2013/0042556 | A1 * | 2/2013 | Armijo | E04C 2/40 52/309.4 |
| 2015/0082729 | A1 * | 3/2015 | Gompper | E04B 1/40 403/345 |
| 2015/0198781 | A1 * | 7/2015 | Kang | G03B 5/00 348/360 |
| 2017/0074307 | A1 * | 3/2017 | Slagle | F16B 12/26 |
| 2018/0051731 | A1 | 2/2018 | Lewis | |
| 2018/0058748 | A1 * | 3/2018 | Costanza | E04B 1/6183 |
| 2019/0145699 | A1 * | 5/2019 | Mellits | E05B 63/00 312/406 |
| 2019/0249416 | A1 * | 8/2019 | Chadwell | F16B 5/01 |
| 2020/0217342 | A1 * | 7/2020 | Cysewski | F16B 19/00 |
| 2023/0061113 | A1 * | 3/2023 | Keller | E04C 2/34 |

* cited by examiner

SYSTEMS AND METHODS FOR COUPLING COMPOSITE PANELS

CROSS-REFERENCE TO RELATED APPLICATIONS

This application relates to and claims priority benefits from U.S. Provisional Patent Application No. 63/147,834, filed Feb. 10, 2021, which is hereby incorporated by reference in its entirety.

FIELD OF THE DISCLOSURE

Embodiments of the present disclosure generally relate to composite panels, and, more particularly, to systems and methods for coupling composite panels together.

BACKGROUND OF THE DISCLOSURE

Various structures are formed from composite materials. For example, portions of aircraft, such as wings, may be formed from composite materials. The composite material may be or include a polymer matrix reinforced with fibers. The fibers may be bound together with polymers, such as epoxy. Known fibers include glass, carbon, basalt, aramid, or the like.

Typically, composite panels are bonded together during a manufacturing process. Slot cases are secured to a composite panel through bonding. The slot cases are then bonded to a connecting structure of another composite panel to secure the composite panels together prior to and during a curing process, for example. For example, a tab is inserted into the slot case, and adhesive is applied therebetween to secure the tab to the slot case.

As can be appreciated, the process of securing the composite panels together typically requires multiple bonding steps in relation to the slot cases. As such, the process of securing the composite panels together can be labor and time intensive. Further, the adhesive between the tab and the slot case may undesirably overflow onto other portions of the composite panels, cause portions of the composite panels to bulge, and/or the like.

SUMMARY OF THE DISCLOSURE

A need exists for a system and a method for efficiently and effectively securing composite panels together. Further, a need exists for a system and a method for securing composite panels together before and during a curing process that uses less adhesive.

With those needs in mind, certain embodiments of the present disclosure provide a system for securing a first composite panel to a second composite panel. The system includes a latch assembly having one or more latches. The latch assembly is configured to be secured to one of the first composite panel or the second composite panel. One or more strikes are configured to retain at least a portion of the one or more latches. The one or more strikes are configured to be secured to the other of the first composite panel or the second composite panel.

In at least one embodiment, the latch assembly is configured to secure a tab of the first composite panel to a slot case of the second composite panel without adhesive.

In at least one embodiment, the latch assembly is disposed on one of a tab of the first composite panel or a slot case of the second composite panel. The one or more strikes are disposed on the other of the tab of the first composite panel or the slot case of the second composite panel.

As an example, the latch assembly includes a first latch, a second latch, and a lock disposed between the first latch and the second latch. As a further example, the lock is removable from a space between the first latch and the second latch. The first latch and the second latch are moveable when the lock is removed from the space.

As an example, each of the first latch and the second latch includes an upright beam, and an insertion beam connected to the upright beam. The insertion beam is configured to be moved into and out of the one or more strikes.

As an example, the lock includes a first prong connected to a second prong by a cross beam. A channel is formed between the first prong, the second prong, and the cross beam. Portions of the first latch and the second latch are retained within the channel when the first latch abuts the second latch.

As an example, the one or more strikes are disposed on a tab of the first composite panel. The latch assembly includes a first latch and a second latch moveably retained within a slot case of the second composite panel.

As an example, the one or more strikes include a plurality of strikes disposed on the first composite panel. The latch assembly includes a single latch having a plurality of latching elements within a slot case of the second composite panel.

In at least one embodiment, each of the first composite panel and the second composite panel comprises a honeycomb core sandwiched between an inner skin and an outer skin.

Certain embodiments of the present disclosure provide a method for securing a first composite panel to a second composite panel. The method includes securing a latch assembly having one or more latches to one of the first composite panel or the second composite panel; securing one or more strikes to the other of the first composite panel or the second composite panel; and retaining, by the one or more strikes, at least a portion of the one or more latches.

Certain embodiments of the present disclosure provide a system including a first composite panel, a second composite panel secured to the first composite panel in an orthogonal orientation, a latch assembly having one or more latches (wherein the latch assembly is secured to one of the first composite panel or the second composite panel), and one or more strikes configured to retain at least a portion of the one or more latches (wherein the one or more strikes are secured to the other of the first composite panel or the second composite panel).

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

As noted, a slot case can be used to connect a composite panel to another composite panel. However, the slot case is typically adhesively bonded to a first composite panel, and then a tab of a second composite panel is then adhesively bonded to the slot case, thereby increasing manufacturing time and cost.

Embodiments of the present disclosure provide a system and a method for coupling composite panels together without the need for adhesively bonding a tab to a slot case. The system and method include a mechanical slide lock that secures the tab to the slot case, thereby allowing an assembly including the composite panels to be efficiently and effectively built, and easily disassembled, if needed. In at least one embodiment, the mechanical slide lock includes one or more latches that are configured to slidably couple to one or more strikes. The latches can be on a tab of a first composite panel, and the strikes can be part of a slot case or receive of a second composite panel, or vice versa.

In at least one embodiment, one or more sliding latches are integrated into either the slot case or a tab panel of a composite panel. Locking keys can hold the latches in a first position before an assembly process, and ensure they remain in a locked second position after the assembly process.

Figure 1:
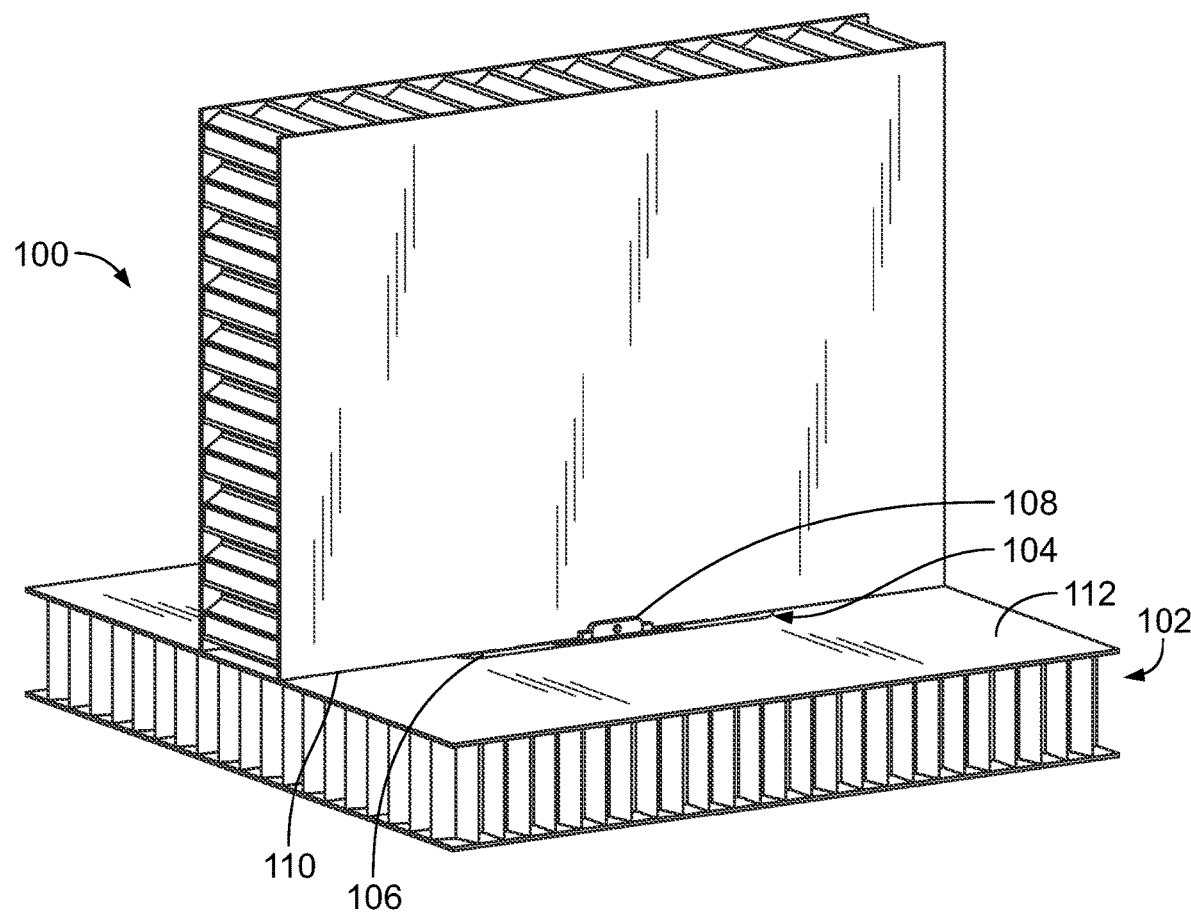
FIG. 1 illustrates perspective view of a first composite panel coupled to a second composite panel, according to an embodiment of the present disclosure.

FIG. 1 illustrates perspective view of a first composite panel 100 coupled to a second composite panel 102, according to an embodiment of the present disclosure. A system 104 secures the first composite panel 100 to the second composite panel 102. As shown, the first composite panel 100 is orthogonal to the second composite panel 102. For example, the first composite panel 100 is perpendicular or substantially perpendicular (for example, +/−5 degrees) to the second composite panel 1002. In at least one embodiment, the system 104 secures the first composite panel 100 to the second composite panel 102 in an orthogonal orientation.

The system 104 includes a receiver or slot case 106 secured to the second composite panel 102 (or optionally, the first composite panel 100), and a latch assembly 108 secured to the first composite panel 100 (or optionally, the second composite panel 102).

The latch assembly 108 can be secured to a tab extending outwardly from a perimeter edge wall 110 of the first composite panel 100. The slot case 106 can be formed in (such as integrally recessed into) an outer face wall 112 of the second composite panel 102. As shown, the system 104 secures the first composite panel 100 to the second composite panel 102 in an edge-to-face fashion. Optionally, the slot case 106 can be formed in the perimeter edge wall 110, and the latch assembly 108 can be formed in the outer face wall 112. As another example, the latch assembly 108 and the slot case 106 can be formed in perimeter edge walls of the composite panels 100 and 102, so as to connect the first composite panel 100 to the second composite panel 102 in an edge-to-edge fashion. As another example, the latch assembly and the slot case 106 can be formed in outer face walls of the composite panels 100 and 102, so as to connect first composite panel 100 to the second composite panel 102 in a face-to-face fashion.

As described herein, the system 104 includes a latch assembly having at least one latch that is configured to latchably couple to at least one strike to secure the tab of the first composite panel 100 to the slot case 106 of the second composite panel assembly 100. A plurality of systems 104 can be used to secure the first composite panel 100 to the second composite panel 102, such as along a seam therebetween. In at least one embodiment, the system 104 secures the composite panels 100 and 102 together before and during a curing process, for example.

The system 104 secures the first composite panel 100 to the second composite panel 102, and includes a latch assembly having one or more latches. The latch assembly is secured to one of the first composite panel 100 or the second composite panel 102. A strike is configured retain at least a portion of the one or more latches. The strike is secured to the other of the first composite panel 100 or the second composite panel 102.

Figure 2:
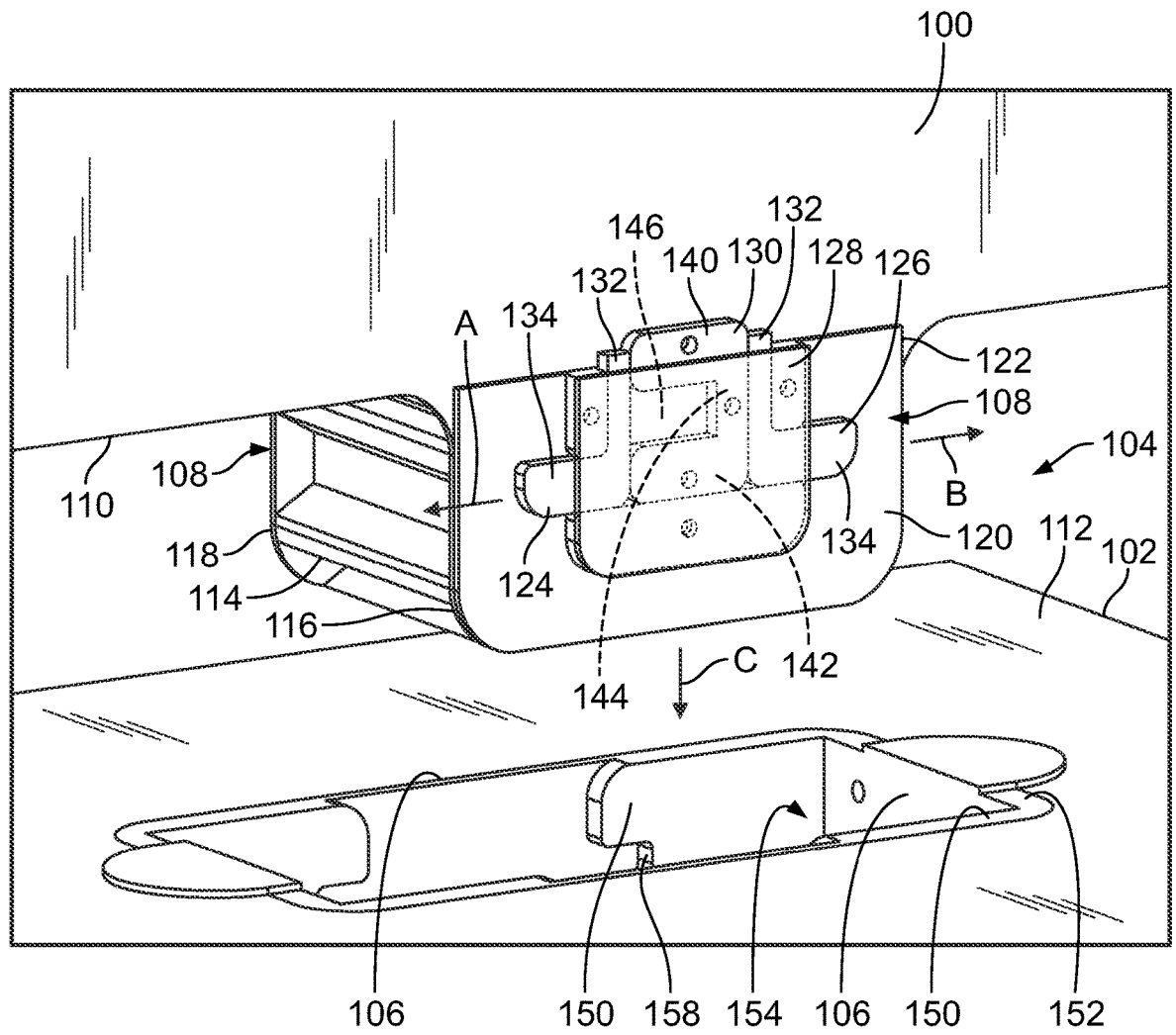
FIG. 2 illustrates a perspective view of a latch assembly positioned over a slot case, according to an embodiment of the present disclosure.

FIG. 2 illustrates a perspective view of the latch assembly 108 positioned over the slot case 106, according to an embodiment of the present disclosure. The slot case 106 is secured to the tab 114 extending outwardly (for example, downwardly) from the edge wall 110 of the first composite panel 100. As shown, a first latch assembly 108 can be on a first side 116 of the tab 114, and a second latch assembly 108 can be on a second side 118 (opposite from the first side 116) of the tab 114.

The latch assembly 108 includes a base 120 that secures over a face 122 of the tab 114. The latch assembly 108 further includes a first latch 124 and a second latch 126 secured to the base 120, such as by a cover 128. A lock 130 is disposed between the first latch 124 and the second latch 126. In at least one embodiment, the first side 116 of the tab 114 can be bonded to the base 120. Optionally, a peak and stick adhesive can be applied to tab 114. As another example, an epoxy can be used.

In at least one embodiment, the first latch 124, the second latch 126, and the lock 130 can be retained within reciprocal channels, recesses, grooves, or the like formed in the base 120. Optionally, the latch assembly 108 does not include the cover 128.

The first latch 124 includes an upright beam 132 connected to an insertion beam 134. As shown, the upright beam 132 can be perpendicular or substantially perpendicular (such as within 10 degrees or less) to the insertion beam 134.

Similarly, the second latch 126 includes an upright beam 132 connected to an insertion beam 134. The upright beam 132 can be perpendicular or substantially perpendicular to the insertion beam 134.

The first latch 124 and the second latch 126 face away from each other. For example, the insertion beam 134 of the first latch 124 extends away from the upright beam 132 in the direction of arrow A, while the insertion beam 134 of the second latch 126 extends outwardly away from the upright beam 132 in the direction of arrow B, which is opposite from the direction of arrow A.

The lock 130 is C-shaped, and includes a first prong 140 connected to an opposite second prong 142 by a cross beam 144. A channel 146 is formed between the first prong 140, the second prong 142, and the cross beam 144.

The slot case 106 is recessed into the second composite panel 102. The slot case 106 can be secured inside a reciprocal channel formed in the second composite panel 102, such as by adhesive. The slot case 106 is sized and shaped to receive and retain the tab 114. The slot case 106 includes lateral walls 150 connected to an end walls 152 and a base (hidden from view in FIG. 2). A tab chamber 154 is defined between the lateral walls 150, the end walls 152, and the base.

An insertion recess 156 is formed in each lateral wall 150. Strikes 158 are formed in the lateral walls 150 and connect to the insertion recess 156.

In a disconnected or uncoupled state, the tab 114 is not disposed in the tab chamber 154. Instead, as shown in FIG. 2, the first composite panel 100 is first disposed over the second composite panel 102 such that the tab 114 is aligned over the tab chamber 154.

Before the tab 114 is inserted into the tab chamber 154, the latch assembly 108 is in a first position, such as an extended position, in which the lock 130 separates the first latch 124 from the second latch 126. In order to secure the first composite panel 100 to the second composite panel 102, the first composite panel 100 is urged toward the second composite panel 102 so that the tab 114 moves in the direction of arrow C into the tab chamber 154.

Figure 3:
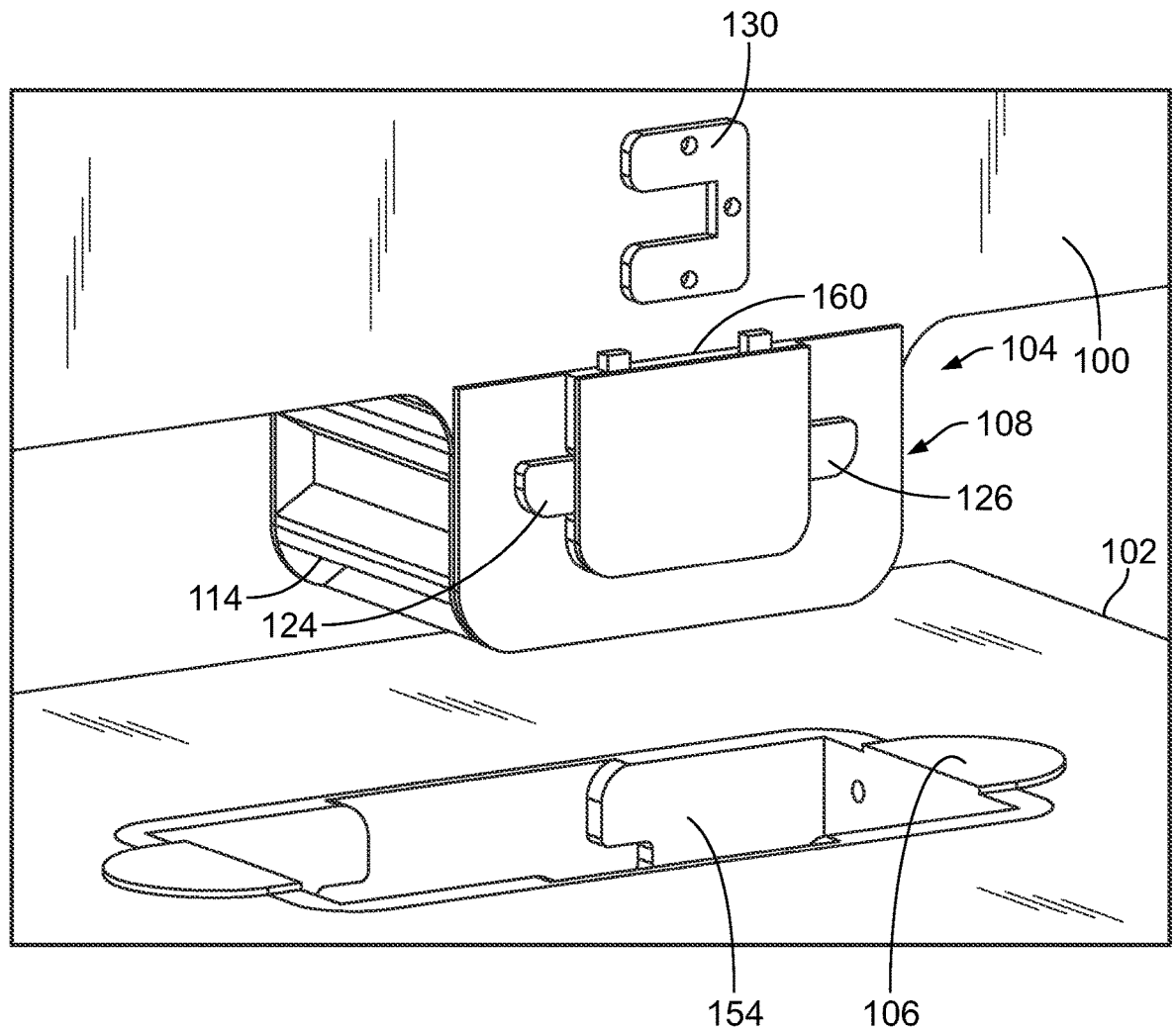
FIG. 3 illustrates a perspective view of a latch assembly positioned over a slot case in which a lock is removed from a space between a first latch and a second latch, according to an embodiment of the present disclosure.

FIG. 3 illustrates a perspective view of the latch assembly 108 positioned over the slot case 106 in which the lock 130 is removed from a space 160 between the first latch 124 and the second latch 126, according to an embodiment of the present disclosure. Before the tab 114 is inserted into the tab chamber 154 of the slot case 106, the lock 130 is removed from the space 160. After the lock 130 is removed from the space 160, the first latch 124 and the second latch 126 are moved (such as slid) together. In at least one embodiment, the latch assemblies 108 on opposite sides of the tab 114 are manipulated in such fashion.

Figure 4:
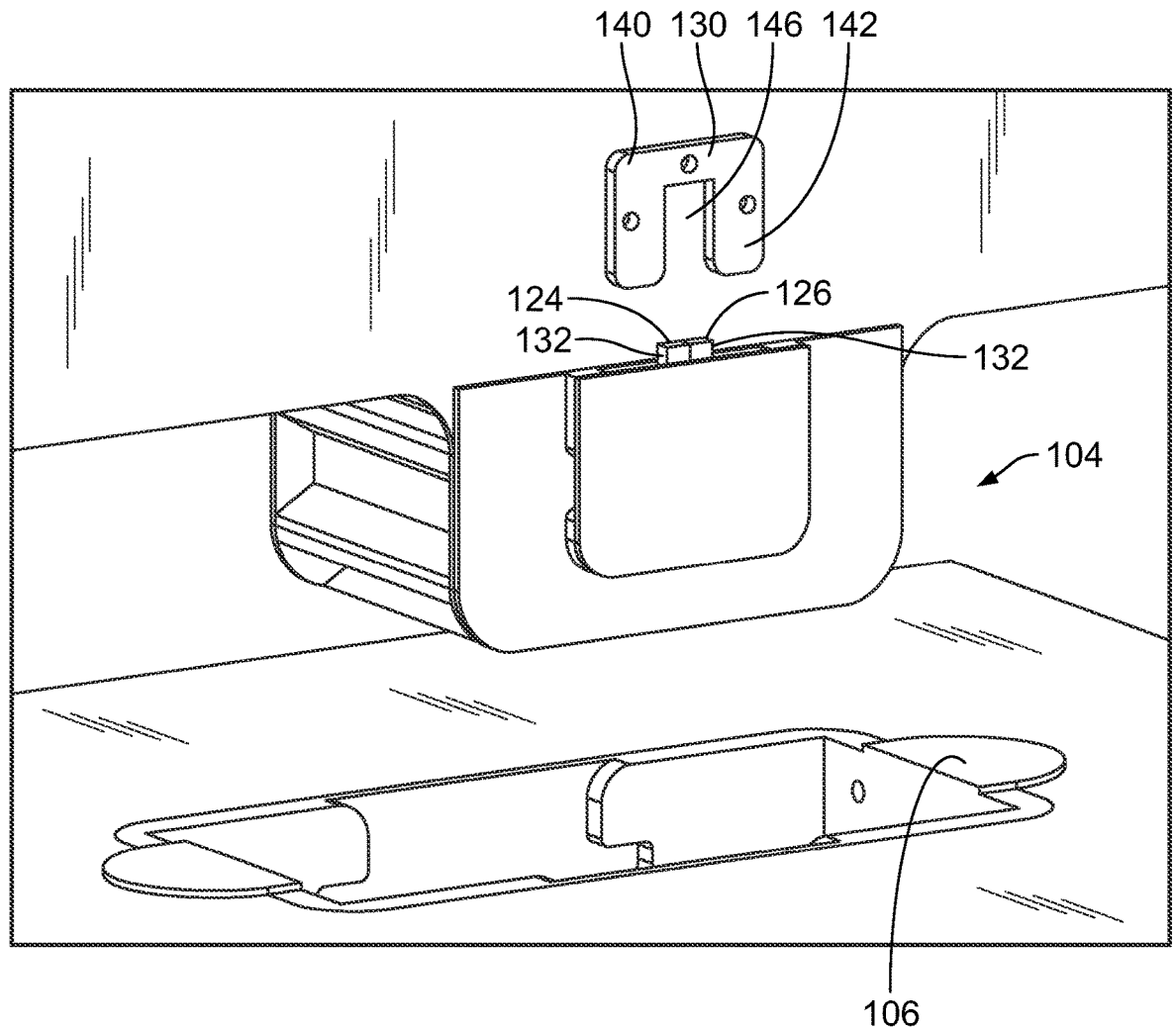
FIG. 4 illustrates a perspective view of the latch assembly in which the first latch and the second latch abut into one another, according to an embodiment of the present disclosure.

FIG. 4 illustrates a perspective view of the latch assembly 108 in which the first latch 124 and the second latch 126 abut into one another, according to an embodiment of the present disclosure. When the first latch 124 and the second latch 126 abut against one another, the respective upright beams 132 abut against one another. As such, the latch assembly 108 is in a retracted position, in which the insertion beams 134 (shown in FIG. 2) are within the cover 128, and have a combined width that is less than the width of the insertion recess 156 (shown in FIG. 2) of the slot case 106. As such, latch assembly 108 is able to slide into the tab chamber 154 with the insertion beams 134 sliding into the insertion recess 156. The lock 130 can be moved over the upright beams 132 such that the abutting upright beams 132 fit within the channel 146 of the lock 130 and are therefore moveably constrained by the prongs 140 and 142. The tab 114 is then inserted into the tab chamber 154, such that the first latch 124 and the second latch 126 slide into the insertion recess 156. In at least one embodiment, the latch assemblies 108 on opposite sides of the tab 114 are manipulated in such fashion.

Figure 5:
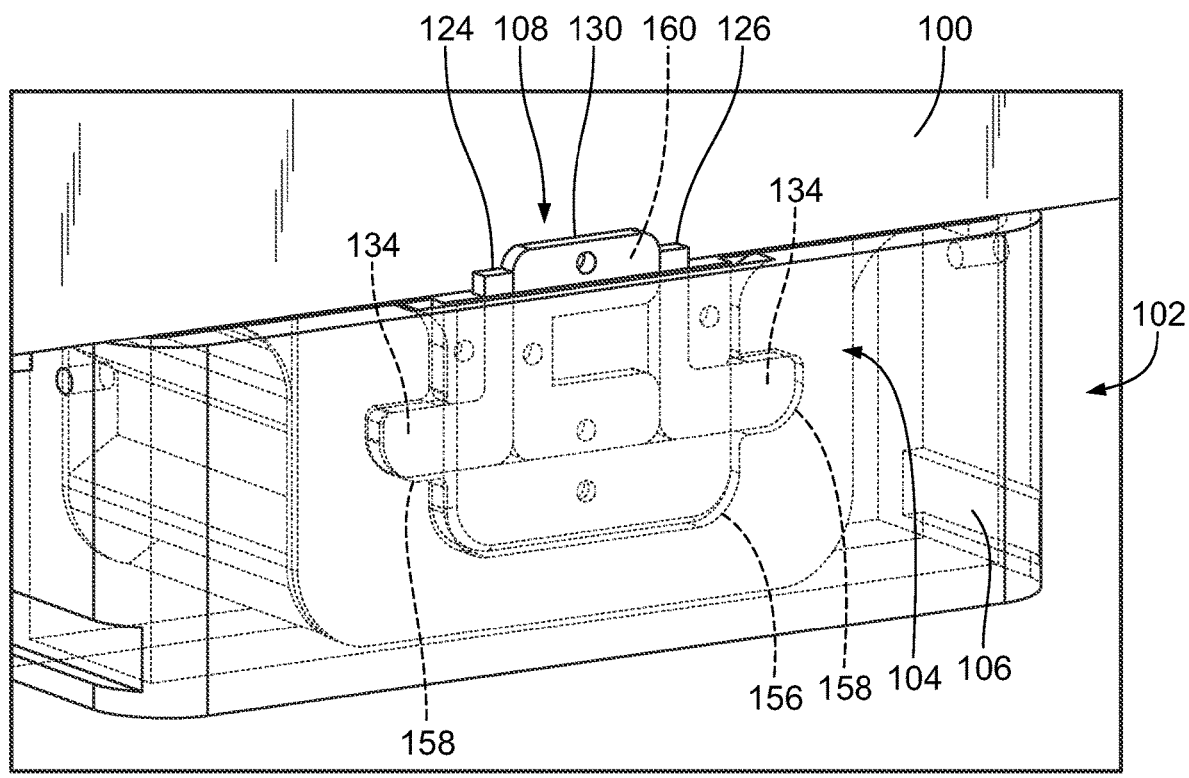
FIG. 5 illustrates a perspective view of the system having the latch assembly in a securing position in relation to the slot case, according to an embodiment of the present disclosure.

FIG. 5 illustrates a perspective view of the system 104 having the latch assembly 108 in a securing position in relation to the slot case 106, according to an embodiment of the present disclosure. For the sake of clarity, portions of the system 104 are shown transparent. After the latch assembly 108 is inserted into the insertion recess 156, the first latch 124 and the second latch 126 are moved (such as slid) away from one another. During such motion, the insertion beams 134 of the first latch 124 and the second latch 126 are moved into respective strikes 158 of the slot case 106. The lock 130 is then moved back into the space 160 between the first latch 124 and the second latch 126 to prevent the insertion beams 134 from retreating from the strikes 158. In this manner, the latch assembly 108 is securely coupled to the slot case 106, thereby securing the first composite panel 100 to the second composite panel 102. In at least one embodiment, the latch assemblies 108 on opposite sides of the tab 114 are manipulated in such fashion.

Figure 6:
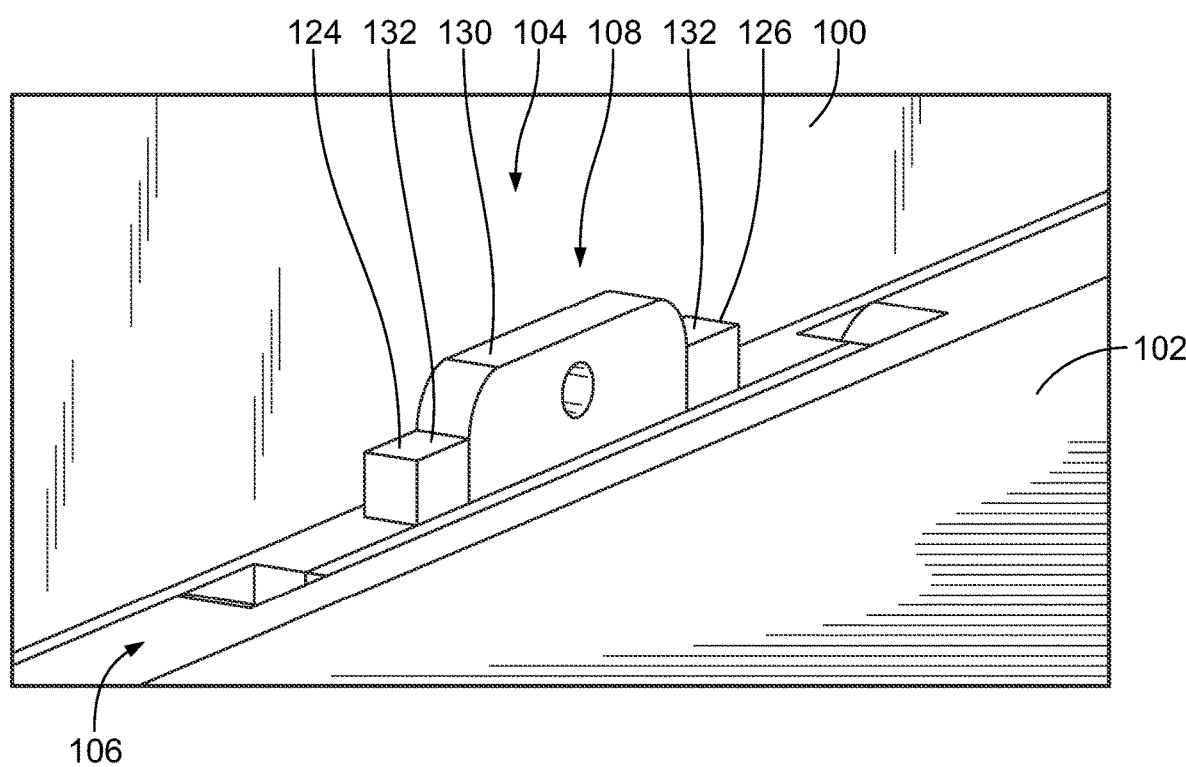
FIG. 6 illustrates a perspective view of the first composite panel secured to the second composite panel by the system, according to an embodiment of the present disclosure.

FIG. 6 illustrates a perspective view of the first composite panel 100 secured to the second composite panel 102 by the system 104, according to an embodiment of the present disclosure. Referring to FIGS. 1-6, as shown, the lock 130 and upper ends of the insertion beams 132 extend above the second composite panel 102 and on sides of the first composite panel 100. As such, the lock 130 can be grasped and removed, such that the first latch 124 and the second latch 126 can be moved together, thereby removing the insertion beams 134 from the strikes 158. Accordingly, the first composite panel 100 can be easily disconnected from the second composite panel 102, as the first latch 124 and the second latch 126 are no longer securely retained by the strikes 158.

Figure 7:
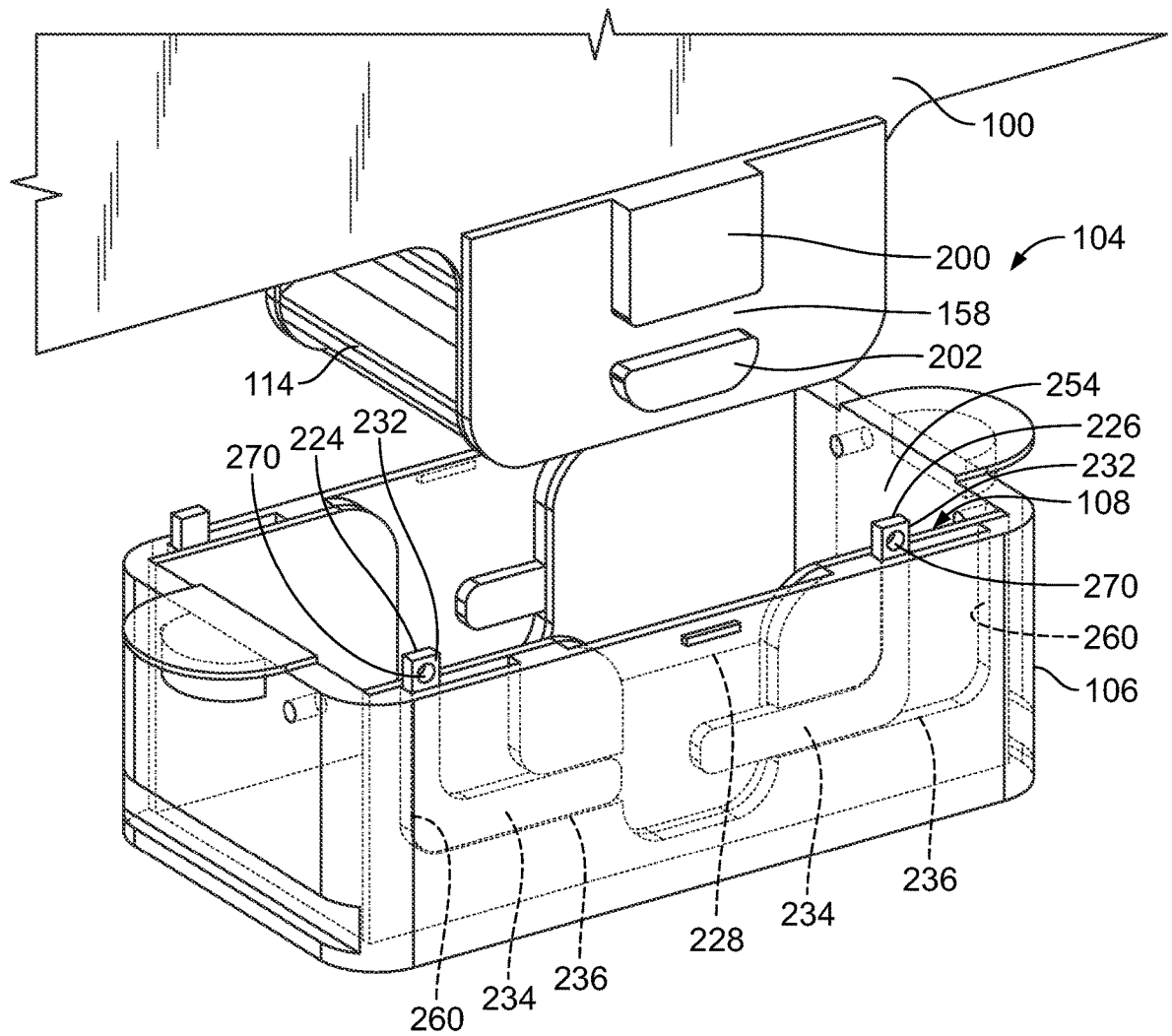
FIG. 7 illustrates a perspective view of a tab of a first composite panel positioned over a slot case, according to an embodiment of the present disclosure.

FIG. 7 illustrates a perspective view of a tab of a first composite panel 100 positioned over a slot case 106, according to an embodiment of the present disclosure. In this embodiment, the strike 158 is formed on the tab 114, and the latch assembly 108 is retained within the slot case 106.

For example, the strike 158 is disposed on the tab 114 of the first composite panel 100, and the latch assembly 108 includes a first latch 224 and a second latch 224 moveably retained within the slot case 106.

For example, the strike 158 is a channel defined between an upper protuberance 200 and a lower protuberance 202 outwardly extending from the face of the tab 114. The latch assembly 108 includes a first latch 224 and a second latch 226 on opposite sides of an insertion channel 228. In order to the secure the tab 114 to the slot case 106, the first latch 224 and the second latch 226 are spread apart so that respective insertion beams 234 are slidably retained within beam channels 236 outside of the insertion channel 228. The tab 114 is then urged into the tab chamber 254 such that the strike 158 is linearly aligned with the beam channels 236.

In order to secure the latch assembly 108 to the tab 114, the first latch 224 and the second latch 226 are slid toward one another, such that the insertion beams 234 are retained within the strike 158. Locks (such as portions of a cover of the tab 114) can be positioned between the upright beams 232 of the first latch 224 and the second latch 226 and interior walls 260 of the slot case 106 to ensure that the first latch 124 and the second latch 126 do not inadvertently disengage from the strike 158.

In at least one embodiment, the exposed positions of the upright beams 232 can include tool-receiving openings 270. A tool can be inserted into the tool receiving openings 270 to move the first latch 124 and the second latch 126 between spread positions and securing positions. Optionally, the first latch 124 and the second latch 126 may not include the tool-receiving openings 270.

Figure 8:
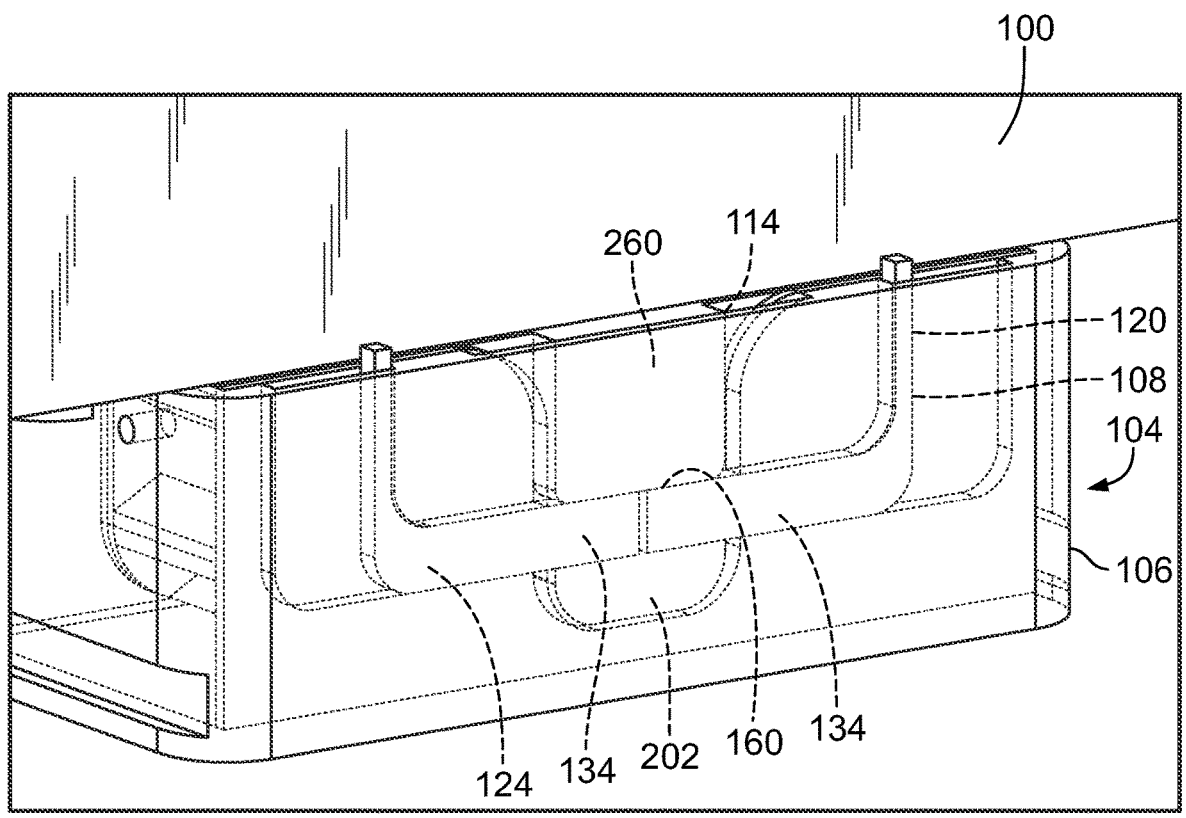
FIG. 8 illustrates a perspective view of the tab of the first composite panel secured to the slot case of FIG. 7.

FIG. 8 illustrates a perspective view of the tab 114 of the first composite panel 100 secured to the slot case 106 of FIG. 7. The system 104 is shown in a securing state, in which the insertion beams 134 of the first latch 124 and the second latch 124 are retained within the strike 158 of the tab 114.

Figure 9:
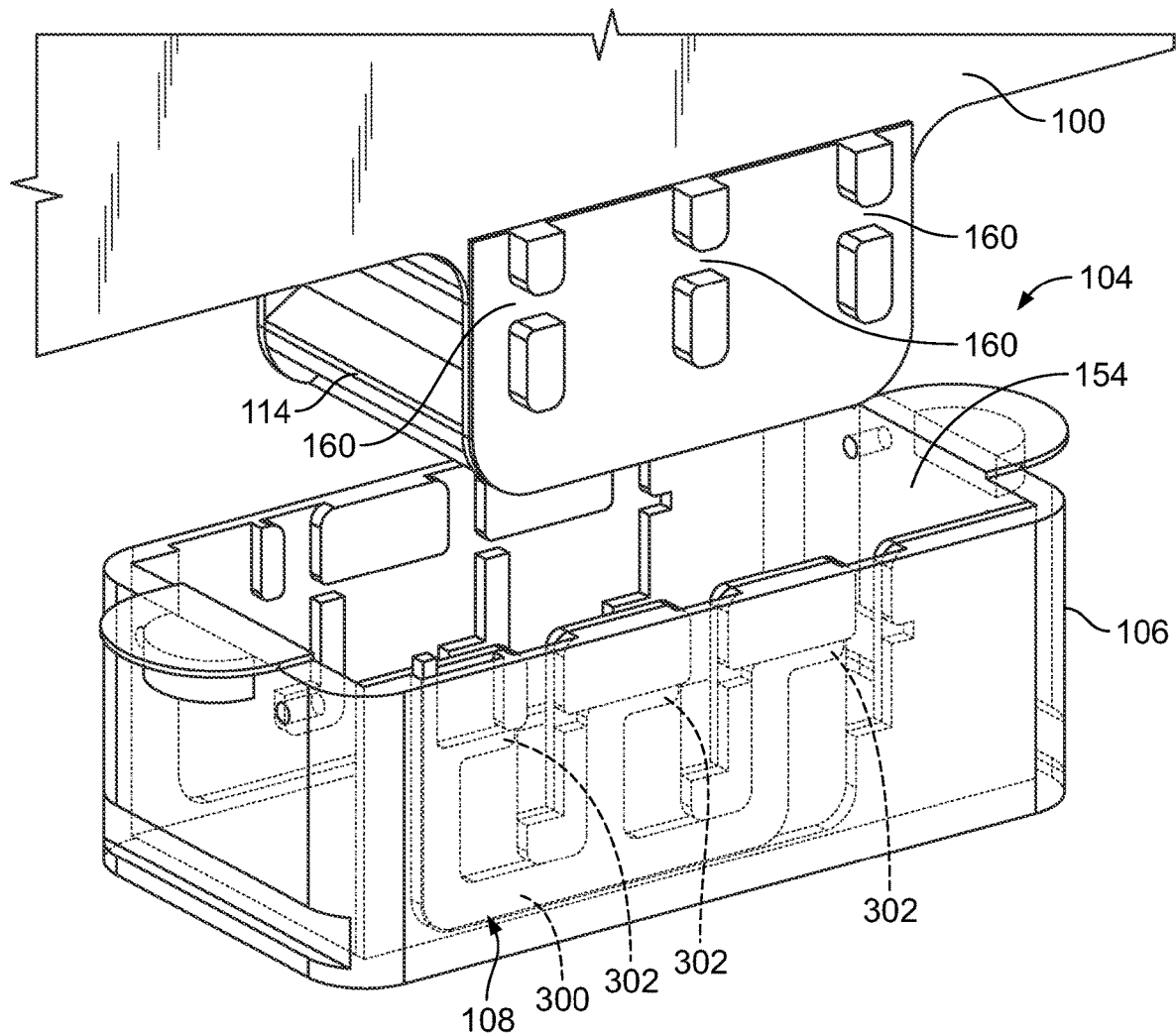
FIG. 9 illustrates a perspective view of a tab of a first composite panel positioned over a slot case, according to an embodiment of the present disclosure.

FIG. 9 illustrates a perspective view of a tab 114 of a first composite panel 100 positioned over a slot case 106, according to an embodiment of the present disclosure. In this embodiment, a plurality of strikes 158 are formed on the tab 114. A latch assembly 108 includes a single latch 300 slidably retained within reciprocal channels formed in the slot case 106. The tab 114 is configured to be inserted into the tab chamber 154, and latching elements 320 of the latch 300 are configured to slide into the strikes 158, similar to as described above. The tab 114 can include more or less strikes 158 than shown. Additionally, the latch 300 can include more or less latching elements 320 than shown.

Figure 10:
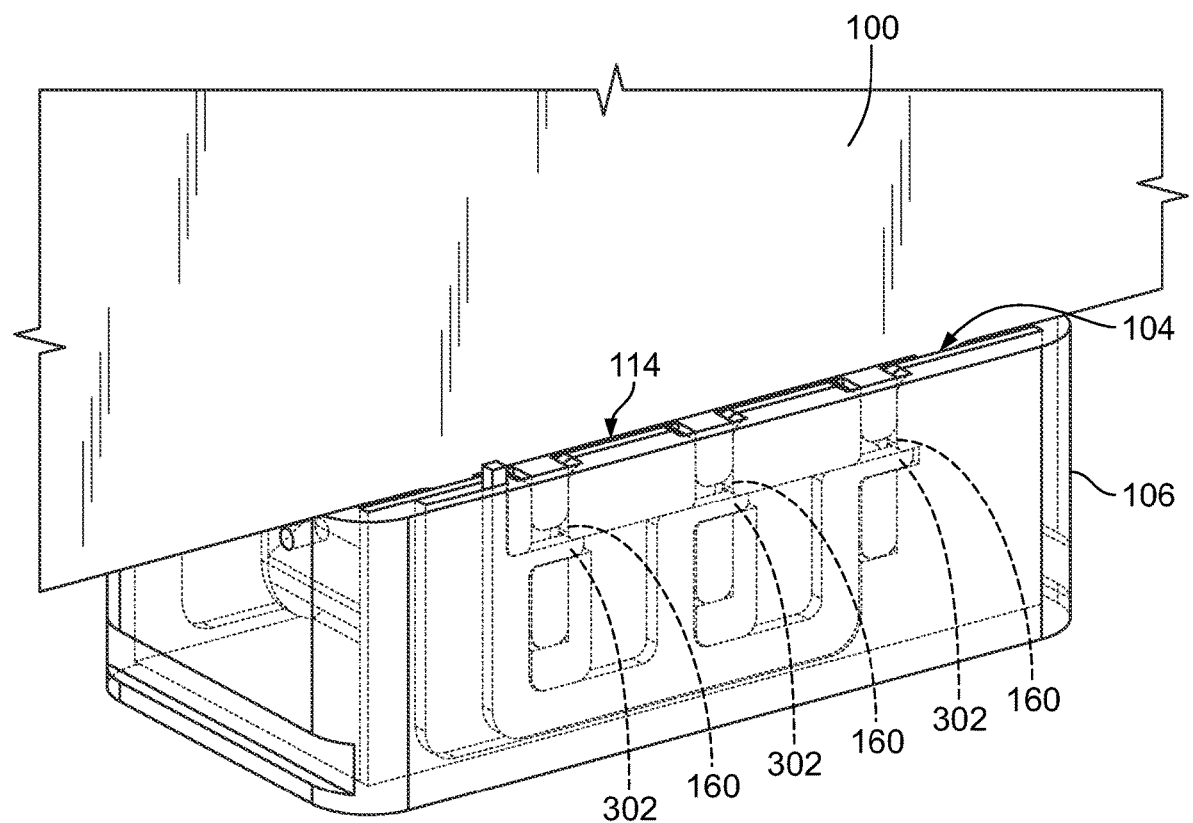
FIG. 10 illustrates a perspective view of the tab of the first composite panel secured to the slot case of FIG. 9.

FIG. 10 illustrates a perspective view of the tab 114 of the first composite panel 100 secured to the slot case of FIG. 9. As shown, the latching elements 302 are retained within the strikes 158, thereby securely retaining the tab 114 to the slot case 106.

Figure 11:
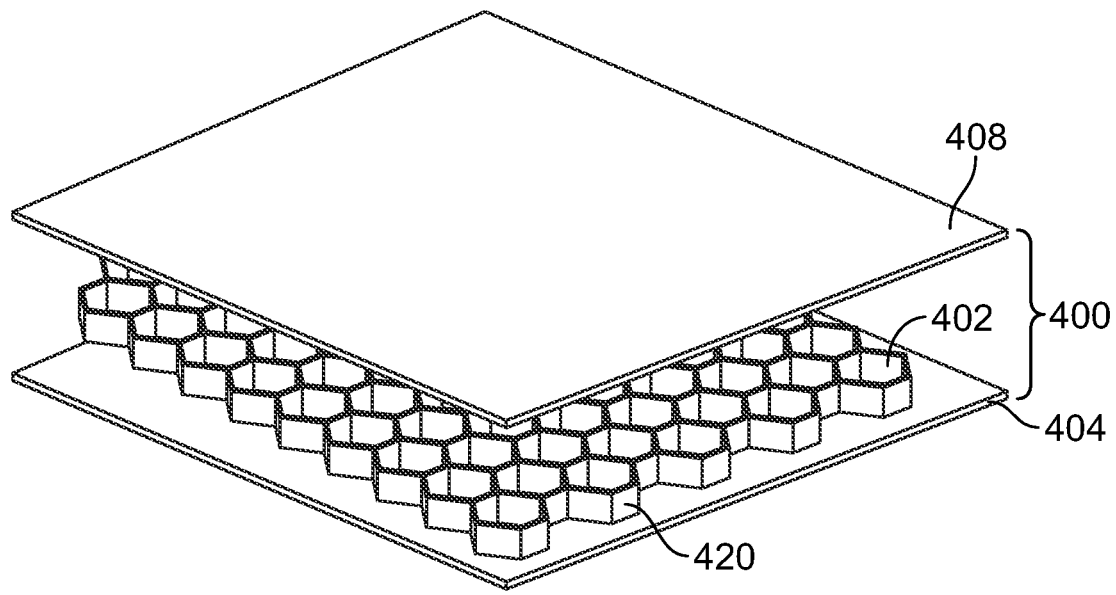
FIG. 11 illustrates a perspective exploded view a composite panel, according to an embodiment of the present disclosure.

FIG. 11 illustrates a perspective exploded view of a composite panel 400, according to an embodiment of the present disclosure. The first composite panel 100 and the second composite panel 102 can be configured as the composite panel 400. In at least one embodiment, the composite panel 400 includes a core 402 sandwiched between an inner skin 404 and an outer skin 408.

In at least one embodiment, the core 402 is a honeycomb core that includes a plurality of interconnected honeycomb cells 420. In at least one other embodiment, the core 402 may be a solid layer or porous foam layer. The core 402 may be formed of aramid fibers, and/or polyamides, for example. The inner skin 404 and the outer skin 408 may be or include one or more pre-impregnated epoxy resin layers that include fibers, such as fiberglass, graphite, Kevlar, and/or the like. The inner skin 404 and the outer skin 408 may be identical to one another. In at least one other embodiment, the inner skin 404 and the outer skin 408 may include more or less layers than one another.

Figure 12:
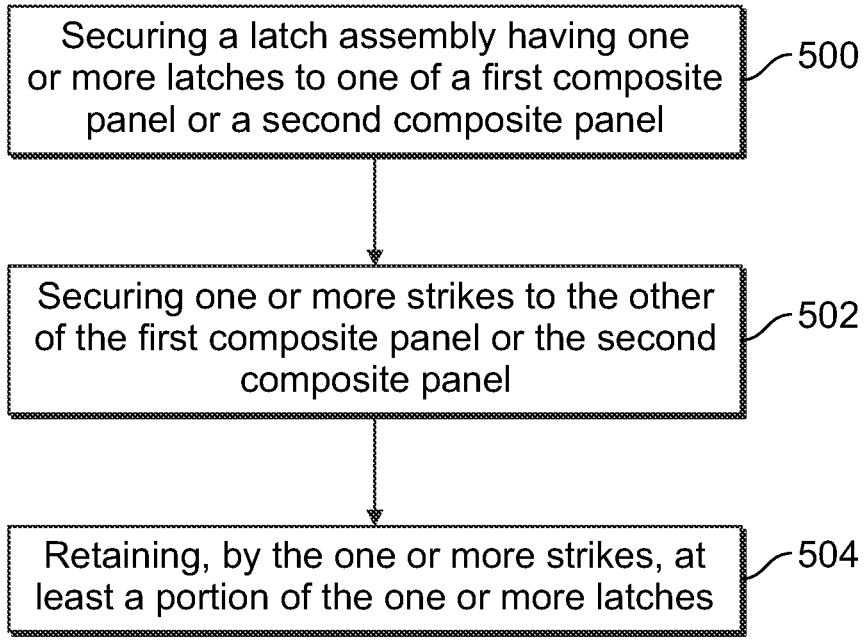
FIG. 12 illustrates a flow chart of a method for securing a first composite panel to a second composite panel, according to an embodiment of the present disclosure.

FIG. 12 illustrates a flow chart of a method for securing a first composite panel to a second composite panel, according to an embodiment of the present disclosure. The method includes securing, at 500, a latch assembly having one or more latches to one of the first composite panel or the second composite panel; securing, at 502, one or more strikes to the other of the first composite panel or the second composite panel; and retaining, at 504, by the one or more strikes, at least a portion of the one or more latches. In at least one embodiment, the method includes bonding a slot case to the second composite panel, for example.

As described herein, embodiments of the present disclosure provide systems and methods for efficiently and effectively securing composite panels together. Further, embodiments of the present disclosure provide systems and methods for securing composite panels together before and during a curing process with less adhesive than prior connectors.

Further, the disclosure comprises embodiments according to the following clauses:

Clause 1. A system for securing a first composite panel to a second composite panel, the system comprising:
a latch assembly having one or more latches, wherein the latch assembly is configured to be secured to one of the first composite panel or the second composite panel; and
one or more strikes configured to retain at least a portion of the one or more latches, wherein the one or more strikes are configured to be secured to the other of the first composite panel or the second composite panel.

Clause 2. The system of Clause 1, wherein the latch assembly is configured to secure a tab of the first composite panel to a slot case of the second composite panel without adhesive.

Clause 3. The system of Clauses 1 or 2, wherein the latch assembly is disposed on one of a tab of the first composite panel or a slot case of the second composite panel, and wherein the one or more strikes are disposed on the other of the tab of the first composite panel or the slot case of the second composite panel.

Clause 4. The system of any of Clauses 1-3, wherein the latch assembly comprises:
a first latch;
a second latch; and
a lock disposed between the first latch and the second latch.

Clause 5. The system of Clause 4, wherein the lock is removable from a space between the first latch and the second latch, and wherein the first latch and the second latch are moveable when the lock is removed from the space.

Clause 6. The system of Clauses 4 or 5, wherein each of the first latch and the second latch comprises:
an upright beam; and
an insertion beam connected to the upright beam, wherein the insertion beam is configured to be moved into and out of the one or more strikes.

Clause 7. The system of any of Clauses 4-6, wherein the lock comprises a first prong connected to a second prong by a cross beam, wherein a channel is formed between the first prong, the second prong, and the cross beam, wherein portions of the first latch and the second latch are retained within the channel when the first latch abuts the second latch.

Clause 8. The system of any of any of Clauses 1-7, wherein the one or more strikes are disposed on a tab of the first composite panel, and wherein the latch assembly comprises a first latch and a second latch moveably retained within a slot case of the second composite panel.

Clause 9. The system of an of any of Clauses 1-8, wherein the one or more strikes comprise a plurality of strikes disposed on the first composite panel, and wherein the latch assembly comprises a single latch having a plurality of latching elements within a slot case of the second composite panel.

Clause 10. The system of any of clauses 1-9, wherein each of the first composite panel and the second composite panel comprises a honeycomb core sandwiched between an inner skin and an outer skin.

Clause 11. A method for securing a first composite panel to a second composite panel, the method comprising:

securing a latch assembly having one or more latches to one of the first composite panel or the second composite panel;

securing one or more strikes to the other of the first composite panel or the second composite panel; and retaining, by the one or more strikes, at least a portion of the one or more latches.

Clause 12. The method of Clause 11, wherein said securing the latch assembly comprises securing, by the latch assembly, a tab of the first composite panel to a slot case of the second composite panel without adhesive.

Clause 13. The method of Clauses 11 or 12, wherein said securing the latch assembly comprises disposing the latch assembly on one of a tab of the first composite panel or a slot case of the second composite panel, and wherein said securing the one or more strikes comprises disposing the one or more strikes on the other of the tab of the first composite panel or the slot case of the second composite panel.

Clause 14. A system comprising:

a first composite panel;

a second composite panel secured to the first composite panel in an orthogonal orientation;

a latch assembly having one or more latches, wherein the latch assembly is secured to one of the first composite panel or the second composite panel;

and one or more strikes configured to retain at least a portion of the one or more latches, wherein the one or more strikes are secured to the other of the first composite panel or the second composite panel.

Clause 15. The system of Clause 14, wherein the latch assembly is configured to secure a tab of the first composite panel to a slot case of the second composite panel without adhesive.

Clause 16. The system of clauses 14 or 15, wherein the latch assembly is disposed on one of a tab of the first composite panel or a slot case of the second composite panel, and wherein the one or more strikes are disposed on the other of the tab of the first composite panel or the slot case of the second composite panel.

Clause 17. The system of any of clauses 14-16, wherein the latch assembly comprises:

a first latch;

a second latch; and a lock disposed between the first latch and the second latch.

Clause 18. The system of Clause 17, wherein the lock is removable from a space between the first latch and the second latch, and wherein the first latch and the second latch are moveable when the lock is removed from the space, wherein each of the first latch and the second latch comprises an upright beam, and an insertion beam connected to the upright beam, wherein the insertion beam is configured to be moved into and out of the one or more strikes, wherein the lock comprises a first prong connected to a second prong by a cross beam, wherein a channel is formed between the first prong, the second prong, and the cross beam, wherein portions of the first latch and the second latch are retained within the channel when the first latch abuts the second latch.

Clause 19. The system of any of Clauses 14-18, wherein the one or more strikes are disposed on a tab of the first composite panel, and wherein the latch assembly comprises a first latch and a second latch moveably retained within a slot case of the second composite panel.

Clause 20. The system of any of Clauses 14-19, wherein each of the first composite panel and the second composite panel comprises a honeycomb core sandwiched between an inner skin and an outer skin.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for securing a first composite panel to a second composite panel, the system comprising:
   a latch assembly configured to be secured to one of the first composite panel or the second composite panel, wherein the latch assembly comprises:
   a first latch;
   a second latch, wherein each of the first latch and the second latch comprises:
   an upright beam;
   an insertion beam connected to the upright beam; and
   a lock disposed between the first latch and the second latch; and
   one or more strikes configured to retain at least a portion of one or both of the first latch or the second latch, wherein the one or more strikes are configured to be secured to the other of the first composite panel or the second composite panel, wherein the insertion beam is configured to be moved into and out of the one or more strikes.

2. The system of claim 1, wherein the latch assembly is configured to secure a tab of the first composite panel to a slot case of the second composite panel without adhesive.

3. The system of claim 1, wherein the latch assembly is disposed on one of a tab of the first composite panel or a slot case of the second composite panel, and wherein the one or more strikes are disposed on the other of the tab of the first composite panel or the slot case of the second composite panel.

4. The system of claim 1, wherein the lock is removable from a space between the first latch and the second latch, and wherein the first latch and the second latch are moveable when the lock is removed from the space.

5. The system of claim 1, wherein the lock comprises a first prong connected to a second prong by a cross beam, wherein a channel is formed between the first prong, the second prong, and the cross beam, wherein portions of the first latch and the second latch are retained within the channel when the first latch abuts the second latch.

6. The system of claim 1, wherein the one or more strikes are disposed on a tab of the first composite panel, and wherein the first latch and the second latch are moveably retained within a slot case of the second composite panel.

7. The system of claim 1, wherein the one or more strikes comprise a plurality of strikes disposed on the first composite panel, and wherein one or both of the first latch or the second latch has a plurality of latching elements within a slot case of the second composite panel.

8. The system of claim 1, wherein each of the first composite panel and the second composite panel comprises a honeycomb core sandwiched between an inner skin and an outer skin.

9. A system comprising:
   a first composite panel;
   a second composite panel secured to the first composite panel in an orthogonal orientation;
   a latch assembly secured to one of the first composite panel or the second composite panel, wherein the latch assembly comprises:
   a first latch;
   a second latch; and
   a lock disposed between the first latch and the second latch, wherein the lock comprises a first prong connected to a second prong by a cross beam, wherein a channel is formed between the first prong, the second prong, and the cross beam, wherein portions of the first latch and the second latch are retained within the channel when the first latch abuts the second latch; and
   one or more strikes configured to retain at least a portion of one or both of the first latch or the second latch, wherein the one or more strikes are secured to the other of the first composite panel or the second composite panel.

10. The system of claim 9, wherein the latch assembly is configured to secure a tab of the first composite panel to a slot case of the second composite panel without adhesive.

11. The system of claim 9, wherein the latch assembly is disposed on one of a tab of the first composite panel or a slot case of the second composite panel, and wherein the one or more strikes are disposed on the other of the tab of the first composite panel or the slot case of the second composite panel.

12. The system of claim 9, wherein the lock is removable from a space between the first latch and the second latch, wherein the first latch and the second latch are moveable when the lock is removed from the space, wherein each of the first latch and the second latch comprises an upright beam, and an insertion beam connected to the upright beam, and wherein the insertion beam is configured to be moved into and out of the one or more strikes.

13. The system of claim 9, wherein the one or more strikes are disposed on a tab of the first composite panel, and wherein the first latch and the second latch are moveably retained within a slot case of the second composite panel.

14. The system of claim 9, wherein each of the first composite panel and the second composite panel comprises a honeycomb core sandwiched between an inner skin and an outer skin.

15. A system for securing a first composite panel to a second composite panel, the system comprising:
    a latch assembly configured to be secured to one of the first composite panel or the second composite panel, wherein the latch assembly comprises:
    a first latch;
    a second latch; and
    a lock disposed between the first latch and the second latch, wherein the lock comprises a first prong connected to a second prong by a cross beam, wherein a channel is formed between the first prong, the second prong, and the cross beam, wherein portions of the first latch and the second latch are retained within the channel when the first latch abuts the second latch; and
    one or more strikes configured to retain at least a portion of one or both of the first latch or the second latch, wherein the one or more strikes are configured to be secured to the other of the first composite panel or the second composite panel.

16. The system of claim 15, wherein the latch assembly is configured to secure a tab of the first composite panel to a slot case of the second composite panel without adhesive.

17. The system of claim 15, wherein the latch assembly is disposed on one of a tab of the first composite panel or a slot case of the second composite panel, and wherein the one or more strikes are disposed on the other of the tab of the first composite panel or the slot case of the second composite panel.

18. The system of claim 15, wherein the lock is removable from a space between the first latch and the second latch, and wherein the first latch and the second latch are moveable when the lock is removed from the space.

19. The system of claim 15, wherein the one or more strikes are disposed on a tab of the first composite panel, and wherein the first latch and the second latch are moveably retained within a slot case of the second composite panel.

20. The system of claim 15, wherein the one or more strikes comprise a plurality of strikes disposed on the first composite panel, and wherein one or both of the first latch or the second latch has a plurality of latching elements within a slot case of the second composite panel.

* * * * *